(No Model.)
T. P. COLBY.
PINKING MACHINE.
No. 595,278. Patented Dec. 7, 1897.
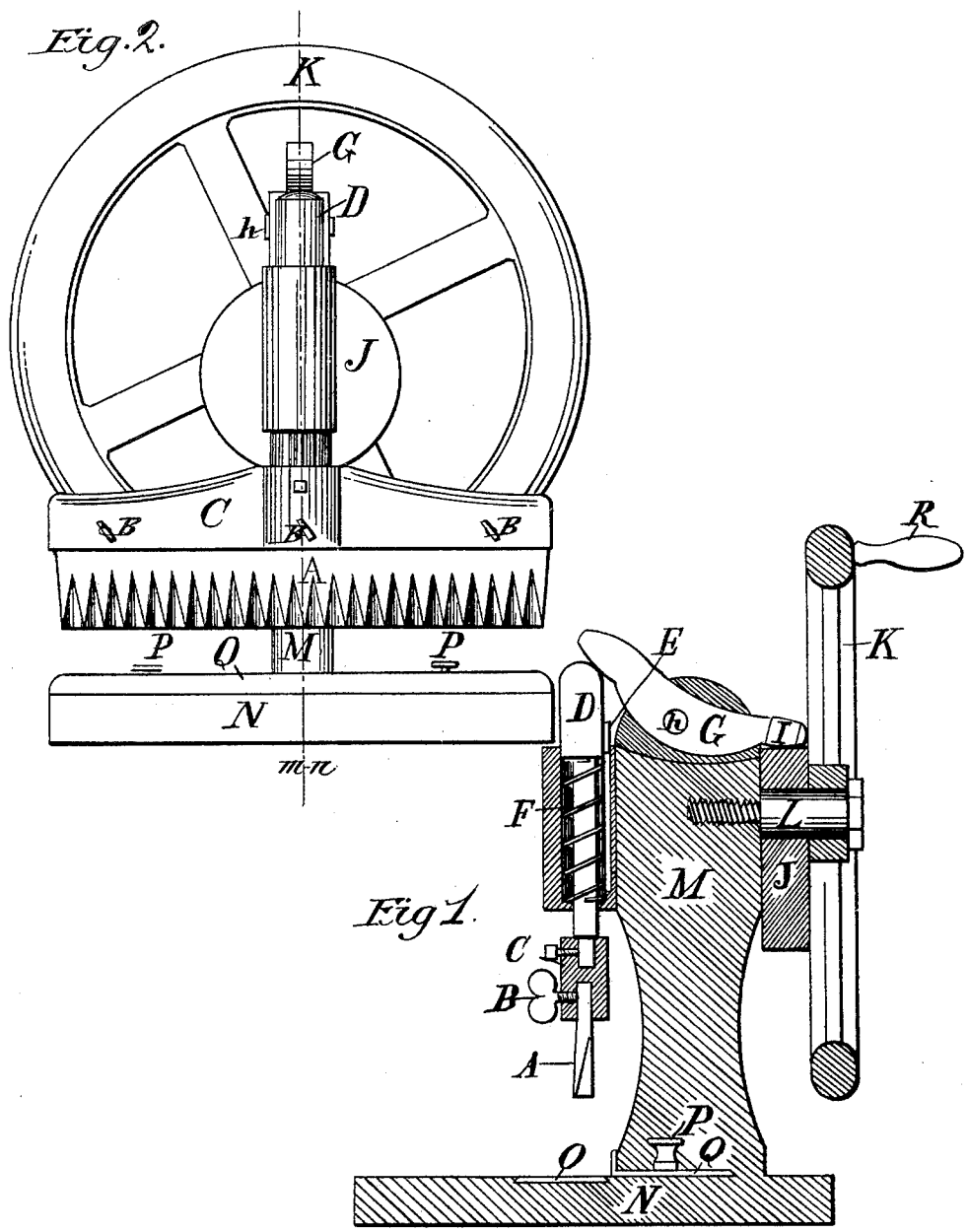
Witnesses.
G. E. Greene.
E. L. Thompson.
Inventor.
T. Parker Colby.

UNITED STATES PATENT OFFICE.

THEODORE PARKER COLBY, OF BOSTON, MASSACHUSETTS.

PINKING-MACHINE.

SPECIFICATION forming part of Letters Patent No. 595,278, dated December 7, 1897.

Application filed May 28, 1896. Serial No. 593,487. (No model.)

*To all whom it may concern:*

Be it known that I, THEODORE PARKER COLBY, a citizen of the United States, residing at Boston, in the county of Suffolk and State of Massachusetts, have invented a new and useful Pinking-Machine, of which the following is a specification, reference being had to the accompanying drawings, forming a part thereof.

My invention relates to improvements in pinking-machines, whereby with compound leverage several layers of material may be pinked at the same time, and by one action of the irons or cutters, of which there may be several side by side or forged together on a bar that slides into a beam which operates as an individual tool, thereby getting a uniform edge, and in line, thus expediting the work, and, further, providing a simple machine to operate that combines the requisite power and durability, and in which the various patterns of cutters can be used.

Figure 1 is a vertical side sectional view of the machine. The line $m\ n$ in Fig. 2 indicates where this view is taken. Fig. 2 is a front vertical view of the machine.

Similar letters refer to similar parts throughout both views.

A is the pinking irons or cutters, held in place by the thumb-screws B in the beam C, which is rigidly attached horizontally to the spindle D, said spindle being raised by the spiral spring F (see Fig. 1) after each depression. Said spring rests upon a shoulder left in the hole bored in the standard M for said spindle to be worked in vertically. E, as shown in Fig. 1, is a key which guides said spindle and prevents its turning by running in a groove in standard M.

The spindle D is forced down by lever G, which is held in the slot in the top of standard M by pin $h$, said lever being provided with an antifriction-roll I, as shown in Fig. 1, at the point of contact with the cam J, said cam to be rigidly attached to balance-wheel K, said balance-wheel to have free play upon the stud L, as shown in Fig. 1, which supports said balance-wheel by being screwed into standard M at a point determined by the length of the stroke required. Standard M is vertical to base-plate N and permanently affixed thereto. The copper plate O, Fig. 1, slides across the base-plate N in the groove provided for it beneath the irons or cutters A. The adjustable gage Q is held in place by the thumb-screw P on base-plate N, while R is a handle to balance-wheel K, Fig. 1.

Having set the machine up, as above indicated by letters from A to R, we operate it thus: Place the materials to be pinked upon the base-plate and against the gage, which must be set back far enough to allow the uneven edges to come under the irons or cutters, and to the ends of the irons or cutters, either right or left, whichever way is desired or more convenient to feed, hold the work with one hand and give the wheel a quick revolution with the other. This revolves the cam, which in turn raises the lever, which depresses the spindle, with the beam and irons or cutters attached and adjusted, down to the copper plate in the base. Having properly-sharpened irons or cutters, they have passed through the materials. Now the irons or cutters are raised up clear from the work and ready for action again. When the work has been fed along for the distance which has been pinked, the irons or cutters are raised by the action of the cam rotating toward its axis and with the pressure of the spring holds up the spindle when at rest. It is advisable to have a long bevel on the irons or cutters, as it is possible then to pink a great number of layers of silk, woolen, cotton, linen, jute, leather, paper, or other materials desired to be pinked.

What I claim as my invention, and for which I pray that Letters Patent be granted, is—

The combination in a pinking-machine, of the body which is composed of the base-plate N, and standard M, a balance-wheel K with cam J permanently affixed thereto, said balance-wheel attached to said standard by stud L upon which it has free play, said cam acting upon a lever G, which is provided with an antifriction-roll I at the point of contact with said cam, said lever supported and held in place in slot at the upper part of said standard by a pin $h$, a spindle D which is depressed by said lever, and raised by spring F resting upon a shoulder in the hole bored for said spindle in said standard, said spindle provided with key E to prevent turning, a beam C with set-screws B, attached to said spindle, the irons or cutters A adjustable in said beam, gage Q, thumb-screws P, and plate O, all substantially as indicated, specified and set forth.

T. PARKER COLBY.

Witnesses:
G. E. GREENE,
E. L. THOMPSON.